H. B. Stiles,

Hydraulic Engine,

Nº 52,459. Patented Feb. 6, 1866.

Witnesses:
Nelson H. Clark
William B Stoddard

Inventor:
Henry B Stiles
by his atty
John E. Early

United States Patent Office.

HENRY B. STILES, OF NEW HAVEN, CONNECTICUT.

IMPROVEMENT IN WATER-MOTORS.

Specification forming part of Letters Patent No. 52,459, dated February 6, 1866.

*To all whom it may concern:*

Be it known that I, HENRY B. STILES, of New Haven, in the county of New Haven and State of Connecticut, have invented a new and useful Improvement in Water-Motors; and I do hereby declare the following, when taken in connection with the accompanying drawings and the letters of reference marked thereon, to be a full, clear, and exact description of the same, and which said drawings constitute part of this specification, and represent, in—

Figure 1:
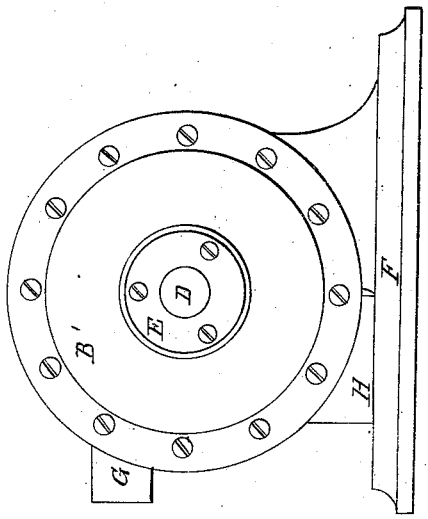
Figure 3:
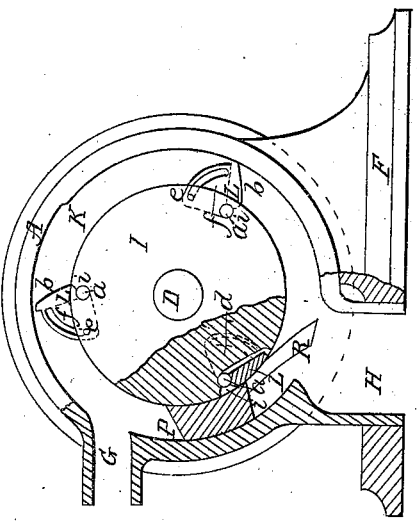
Figure 2:
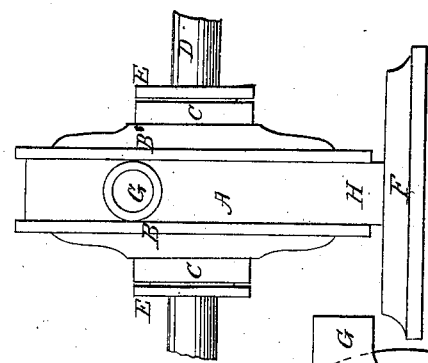
Figure 4:
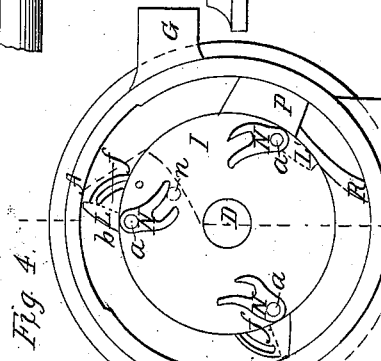
Figure 5:
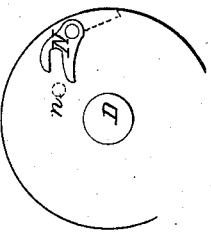

Figure 1, a side view; Fig. 2, an end view; Fig. 3, a sectional view; Fig. 4, a view from the side opposite to Fig. 3, the head removed; Fig. 5, a detached view to illustrate the operation of the valves; and in Fig. 6 a cross-section cutting on the blue line, Fig. 4.

Similar letters indicate corresponding parts.

My invention is designed as a water-motor for use in cities and places supplied by water from a reservoir controlled by water companies or by regulations permitting but limited use of water, its object being to produce a motor which shall require water within the restrictions of such regulations or companies.

To enable others skilled in the art to construct and use my improved motor, I will proceed to fully describe the same, as illustrated in the accompanying drawings.

A is a cylinder, within which the motor is placed, its two ends closed by heads B and B', which support in proper bearings C and centrally within said cylinder the shaft D, packed by common stuffing-boxes E, the whole supported upon a bed, F.

G is the inlet to be connected with a supply-pipe in the usual manner; H, the outlet through which the water passes in its exit from the cylinder.

Figure 6:
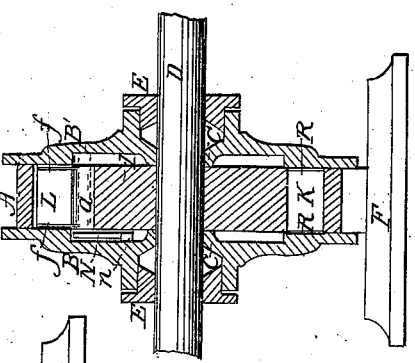

Upon the shaft D and within the cylinder A is placed a smaller cylinder, I, so as to form a chamber, K, around the cylinder I within the cylinder A. To the said cylinder I, I hinge two or more valves, L. (See Fig. 3.) For this purpose I make a recess in the face of the cylinder I, as seen at $d$, so that the said valve L may, when at the position shown at $d$, be flush with the face of the cylinder. The valves L are hung to the cylinder I at $a$ so far below the face of the cylinder I as to give a solid bearing or seat for the valves L, as seen at $i$, Fig. 3. For further support of said valves L, I attach at one or both ends of the valve a slotted quadrant, $f$, working upon a bolt, $e$. The recess in the cylinder made for the valves, as before described, should be so as to leave a space under the valve, as seen at $d$, Fig. 1. The valves L are turned from the position shown at $d$ out to the position denoted at $b$ by means of cams N, attached to the hinge $a$ of the valves upon the outside of the cylinder I, as seen at Fig. 4, and so as to be inclosed within the head, as seen at Fig. 6, and are operated by a stud, $n$, fixed to one of the heads B, as seen in Fig. 6.

The operation of the said cam is as follows: As the cylinder I revolves in the direction denoted by arrows, the valve L closed, as in Fig. 5, with its cam $u$ in the position also shown in Fig. 5, the longer fork of the cam will strike the stud $n$, (see Fig. 5,) the cylinder revolving, the cam bearing against the stud $n$ will be turned to the position denoted at $b$, Fig. 4, and with it the valve L. Water being admitted through the inlet G, its course will be stopped by the bulk-head P, and the force of the water reacting thereon will press directly against the valve L, (see Fig. 4,) and cause the cylinder I to turn in the direction denoted by arrows. The next valve L' will be closed until it passes the bulk-head P, when it in its turn will be opened in like manner, as described, for valve L, when it will receive the force of the water and continue the movement of the cylinder I. After the second valve has passed so far up as to close the chamber K, the water admitted to the first valve and between that and the second valve may pass freely out through the outlet H, and as the first valve approaches the bulk-head P it will strike a ledge, R, upon one or both heads, inclined, as seen in Figs. 3 and 4, so as to close the valve as it passes onto the bulk-head P, as seen in Figs. 3 and 4.

I represent and prefer three valves, as shown in the drawings, for the use of which I make a chamber, K, larger over the top, as seen in Fig. 4, so as to permit the free passage of the water flowing into the cylinder over one valve to the next.

The recess in the cylinder I below the valve L, as seen at $d$, Fig. 3, is made to permit water flowing into the cylinder to pass freely under the valve before it commences its outward movement after having passed the bulk-head.

By this construction the great friction found in nearly all the motors now in use is almost if not entirely overcome, and the power obtained is nearly equal to the pressure of the water. Power is taken from the shaft in the usual manner.

Having, therefore, thus fully described my invention, what I claim as new and useful, and desire to secure by Letters Patent, is—

The combination of two or more valves, L, with their cams N, when constructed and arranged to operate within a cylinder, substantially as and for the purpose specified.

HENRY B. STILES.

Witnesses:
 JOHN E. EARLE,
 WILSON H. CLARK.